United States Patent
Tang et al.

(10) Patent No.: US 11,348,281 B1
(45) Date of Patent: May 31, 2022

(54) FIXED PATTERN CALIBRATION FOR MULTI-VIEW STITCHING

(71) Applicant: Ambarella International LP, Santa Clara, CA (US)

(72) Inventors: Jian Tang, Shanghai (CN); Qi Feng, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 17/154,231

(22) Filed: Jan. 21, 2021

(30) Foreign Application Priority Data

Jan. 13, 2021 (CN) .......................... 202110040734.2

(51) Int. Cl.
| | |
|---|---|
| *G06T 7/80* | (2017.01) |
| *H04N 13/246* | (2018.01) |
| *H04N 13/327* | (2018.01) |
| *H04N 17/00* | (2006.01) |
| *H04N 5/265* | (2006.01) |
| *H04N 5/247* | (2006.01) |

(52) U.S. Cl.
CPC .............. *G06T 7/80* (2017.01); *H04N 5/247* (2013.01); *H04N 5/265* (2013.01); *H04N 13/246* (2018.05); *H04N 13/327* (2018.05); *H04N 17/002* (2013.01); *G06T 2207/10016* (2013.01); *G06T 2207/30244* (2013.01)

(58) Field of Classification Search
CPC ............. G06T 7/80; G06T 2207/10016; G06T 2207/30244; H04N 13/246; H04N 13/327
See application file for complete search history.

(56) References Cited

U.S. PATENT DOCUMENTS

| | | | | |
|---|---|---|---|---|
| 7,093,751 | B2 * | 8/2006 | Wang | ................. G06Q 20/1085 |
| | | | | 235/379 |
| 8,995,754 | B2 * | 3/2015 | Wu | ......................... G06T 7/75 |
| | | | | 382/154 |
| 10,083,513 | B2 * | 9/2018 | Tsubota | ............... H04N 13/246 |
| 10,797,633 | B2 * | 10/2020 | Wang | ...................... H99Z 99/00 |
| 10,839,557 | B1 * | 11/2020 | Arora | ................... H04N 13/246 |
| 10,992,921 | B1 * | 4/2021 | Cui | ........................ H04N 5/247 |
| 2014/0355820 | A1 * | 12/2014 | Wu | .......................... G06T 7/75 |
| | | | | 382/103 |
| 2016/0241791 | A1 * | 8/2016 | Narayanswamy | ...... G06T 15/00 |
| 2017/0127045 | A1 * | 5/2017 | Lin | ........................... G06T 7/80 |
| 2018/0189565 | A1 * | 7/2018 | Lukierski | .................. G06T 7/74 |

(Continued)

*Primary Examiner* — Brian P Yenke
(74) *Attorney, Agent, or Firm* — Christopher P. Maiorana, PC

(57) ABSTRACT

An apparatus includes an interface and a processor. The interface may be configured to receive video signals from two or more cameras arranged to obtain a predetermined field of view, wherein respective fields of view of each pair of said two or more cameras overlap. The processor may be configured to perform a fixed pattern calibration for facilitating multi-view stitching. The fixed pattern calibration may comprise (a) performing a geometry calibration process to obtain intrinsic parameters and distortion parameters for each lens of the two or more cameras, and (b) applying a pose calibration process to the video signals using (i) the intrinsic parameters and the distortion parameters for each lens of the two or more cameras, and (ii) a calibration board to obtain configuration parameters for the respective fields of view of the two or more cameras.

20 Claims, 9 Drawing Sheets

(56) References Cited

U.S. PATENT DOCUMENTS

| | | | |
|---|---|---|---|
| 2019/0147625 A1* | 5/2019 | Jia | H04N 13/246 |
| | | | 348/187 |
| 2019/0149788 A1* | 5/2019 | Liou | G01B 11/2504 |
| | | | 348/189 |
| 2019/0385324 A1* | 12/2019 | Kume | G01B 11/245 |
| 2020/0234413 A1* | 7/2020 | Park | G06T 15/205 |
| 2020/0264464 A1* | 8/2020 | Matsuda | G02F 1/1396 |
| 2020/0265608 A1* | 8/2020 | Nakao | G01B 11/2536 |
| 2021/0067753 A1* | 3/2021 | Tahara | H04N 9/3185 |
| 2021/0082086 A1* | 3/2021 | Bichu | G06T 7/33 |
| 2021/0090281 A1* | 3/2021 | Geva | H04N 13/239 |
| 2021/0174479 A1* | 6/2021 | Li | G06T 5/006 |
| 2021/0232797 A1* | 7/2021 | Shannon | G06K 9/00033 |

* cited by examiner

FIXED PATTERN CALIBRATION FOR MULTI-VIEW STITCHING

This application relates to Chinese Application No. 202110040734.2, filed Jan. 13, 2021, which is incorporated by reference in its entirety.

FIELD OF THE INVENTION

The invention relates to multi-view stitching generally and, more particularly, to a method and/or apparatus for implementing fixed pattern calibration for multi-view stitching.

BACKGROUND

Due to parallax, perfectly stitching images for all distances is not possible. If two images are well aligned, a relationship between the two images can be obtained from the parallax using a similar triangle:

$$\text{Parallax} = \text{Focal length} * \text{base line} / \text{distance}. \quad \text{EQ. 1}$$

From the above equation, it can be seen that the parallax is related to a camera system. Parallax is more apparent at a short distance than at long distances.

In a conventional calibration method, multi-view stitching calibration is based on calibration targets at specific distances from the camera lenses. After the calibration process, the images from the cameras will be stitched in the location of the target. At the position of the target, the parallax will be zero, but in other positions (e.g., near or far from the specific target distance), parallax should be the real parallax minus the parallax of the position of the target.

There are different stitching distance requirements for different camera systems (e.g., different lens/sensor/baseline). If customers want to use the same camera system to get stitching effect for different distances, they need to run the calibration process multiple times and put a calibration board at the distance of the target for every calibration run. Thus, the conventional process requires calibrating multiple times for every stitching position.

It would be desirable to implement fixed pattern calibration for multi-view stitching.

SUMMARY

The invention encompasses an aspect concerning an apparatus comprising an interface and a processor. The interface may be configured to receive video signals from two or more cameras arranged to obtain a predetermined field of view, where respective fields of view of each pair of the two or more cameras overlap. The processor may be configured to perform a fixed pattern calibration for facilitating multi-view stitching. The fixed pattern calibration generally comprises (a) performing a geometry calibration process to obtain intrinsic parameters and distortion parameters for each lens of the two or more cameras, and (b) applying a pose calibration process to the video signals using (i) the intrinsic parameters and the distortion parameters for each lens of the two or more cameras and (ii) a calibration board to obtain configuration parameters for the respective fields of view of the two or more cameras.

In some embodiments of the apparatus aspect described above, the pose calibration process comprises using at least one of a circle detector and a chessboard detector to detect a circle center or a corner, respectively, on the calibration board, and determining whether a detected point in one view is matched in another view.

In some embodiments of the apparatus aspect described above, the pose calibration process comprises performing an extrinsic calibration for each lens of the two or more cameras using the intrinsic parameters and the distortion parameters for each lens of the two or more cameras, where extrinsic parameters for each lens of the two or more cameras comprise a respective rotation matrix and a respective translate vector. In some embodiments, the pose calibration process further comprises changing a z value of the respective translate vector for each lens of the two or more cameras to a middle distance value or a long distance value while maintaining the respective rotation matrix for each lens of the two or more cameras unchanged.

In some embodiments of the apparatus aspect described above, the pose calibration process comprises projecting key points from world coordinates to image coordinates.

In some embodiments of the apparatus aspect described above, the pose calibration process comprises calculating a respective homography matrix between each adjacent pair of the two or more cameras. In some embodiments, the respective homography matrix between each adjacent pair of the two or more cameras is based on a center view.

In some embodiments of the apparatus aspect described above, the pose calibration process comprises applying the intrinsic parameters and the distortion parameters for each lens of the two or more cameras to a corresponding image, and warping the corresponding image withe the respective homography matrix.

In some embodiments of the apparatus aspect described above, the pose calibration process comprises applying a projection model to views of the two or more cameras. In some embodiments applying a projection model, for horizontal direction stitching the projection model comprises at least one of a perspective model, a cylindrical model, and an equirectangular model, and for vertical direction stitching the projection model comprises at least one of a transverse cylindrical model and a mercator model.

The invention also encompasses an aspect concerning a method of fixed pattern calibration for multi-view stitching with multiple cameras comprising (a) arranging two or more cameras to obtain a predetermined field of view, where respective fields of view of each adjacent pair of the two or more cameras overlap, (b) performing a geometry calibration process to obtain intrinsic parameters and distortion parameters for each lens of the two or more cameras, and (c) applying a pose calibration process to video signals from the two or more cameras using (i) the intrinsic parameters and said distortion parameters for each lens of the two or more cameras and (ii) a calibration board to obtain configuration parameters for the respective fields of view of the two or more cameras.

In some embodiments of the method aspect described above, the pose calibration process comprises using at least one of a circle detector and a chessboard detector to detect a circle center or a corner, respectively, on the calibration board, and determining whether a detected point in one view is matched in another view.

In some embodiments of the method aspect described above, the pose calibration process comprises performing an extrinsic calibration for each lens of the two or more cameras using the intrinsic parameters and the distortion parameters for each lens of the two or more cameras, where extrinsic parameters for each lens of the two or more cameras comprise a respective rotation matrix and a respective translate vector. In some embodiments, the pose calibration process further comprises changing a z value of the respective translate vector for each lens of the two or more cameras to a middle distance value or a long distance value while maintaining the respective rotation matrix for each lens of the two or more cameras unchanged.

In some embodiments of the method aspect described above, the pose calibration process comprises projecting key points from world coordinates to image coordinates.

In some embodiments of the method aspect described above, the pose calibration process comprises calculating a respective homography matrix between each adjacent pair of the two or more cameras. In some embodiments, the respective homography matrix between each adjacent pair of the two or more cameras is based on a center view.

In some embodiments of the method aspect described above, the pose calibration process comprises (a) applying the intrinsic parameters and the distortion parameters for each lens of the two or more cameras to a corresponding image, and warping the corresponding image with the respective homography matrix.

In some embodiments of the method aspect described above, the pose calibration process comprises applying a projection model to views of the two or more cameras. In some embodiments applying a projection model, for horizontal direction stitching the projection model comprises at least one of a perspective model, a cylindrical model, and an equirectangular model, and for vertical direction stitching the projection model comprises at least one of a transverse cylindrical model and a mercator model.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing fixed pattern calibration for multi-view stitching that may (i) use targets (e.g., calibration boards, etc.) at a short distance for stitching calibration, (ii) calculate parameters for medium and long distance stitching, (iii) leverage lens intrinsic and distortion information, together with extrinsic calibration information for a target to get good stitching calibration information for any position, (iv) be implemented as a pipelined process, (v) apply different projection models for horizontal and vertical stitching, (vi) be applied to two-dimensional (2D) camera arrays, and/or (vii) be implemented as one or more integrated circuits.

In various embodiments, a new stitching calibration method is provided that uses short distance targets (e.g., calibration boards, etc.) for stitching calibration, and computes parameters for medium and long distance stitching, especially for the long distance stitching case. In various embodiments, the new stitching calibration method generally includes a first step comprising lens calibration and a second step comprising pose calibration. In the first step, geometry calibration is generally performed for each lens to obtain intrinsic parameters and distortion parameters for each lens. The lens calibration step is generally important for distance measuring accuracy in the second, pose calibration step. In the second step, calculations are generally performed using the intrinsic parameters and distortion parameters for each lens, along with extrinsic calibration information for a target to obtain stitching parameter information for any position.

Figure 1:
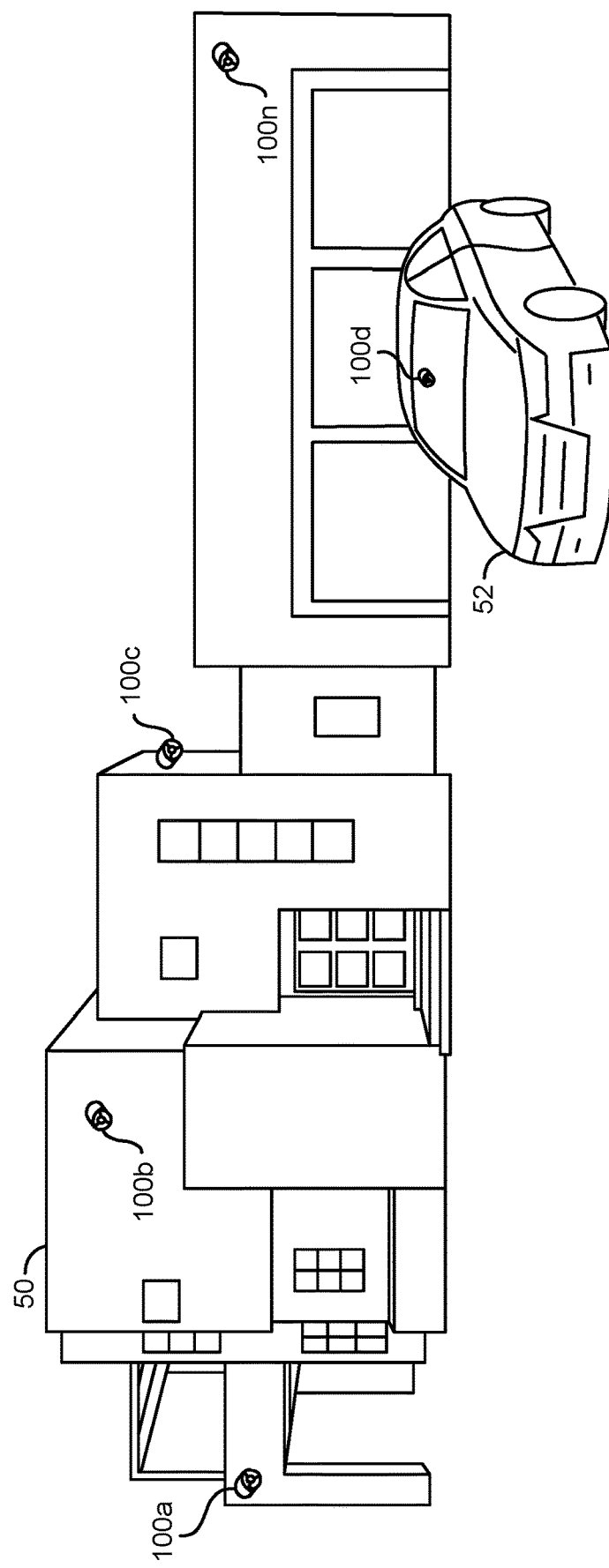
FIG. 1 is a diagram illustrating an example context for implementing an example embodiment of the present invention.

Referring to FIG. 1, a diagram illustrating an example context of the present invention is shown. A home 50 and a vehicle 52 are shown. Camera systems 100a-100n are shown. Each of the cameras 100a-100n may be configured to operate independently of each other. Each of the cameras 100a-100n may be configured to generate video signals communicating images for a respective field of view (FOV). In one example, a number of the cameras 100a-100n may be configured to have overlapping respective fields of view. Respective video frames from all or a subset of the cameras 100a-100n may be stitched together to provide a common field of view that is larger than any of the respective fields of view. In an example, the respective video frames may be stored locally (e.g., on a microSD card, to a local network attached storage (NAS) device, etc.).

Each of the cameras 100a-100n may be configured to detect different or the same events/objects that may be considered interesting. For example, the camera system 100b may capture an area near an entrance of the home 50. For an entrance of the home 50, objects/events of interest may be detecting people. The camera system 100b may be configured to analyze video frames to detect people and may slow down (e.g., select video frames for encoding at a higher frame rate) when a person is detected. In another example, the camera system 100d may capture an area near a vehicle 52. For the vehicle 52, objects/events of interest may be detecting other vehicles and pedestrians when out on the road, and detecting suspicious activity or persons when parked at the home 50. The camera system 100d may be configured to analyze video frames to detect vehicles (or road signs) and people and may slow down when a vehicle or a person is detected.

In general, a "frame" as used herein generally refers to a single captured image of an object or objects in a respective field of view of a camera. Motion video generally comprises a time sequence of frames typically taken at a video rate of ten to thirty frames per second. However, other frame rates may be implemented to meet design criteria of a particular implementation. In general, the term "parallax" is used herein to refer to an apparent change in location of an object, caused by a change in observation position that provides a new line of sight. Parallax generally occurs as a result of two cameras having different centers of projection (COPs). When images from cameras having different COPs are combined without alteration, disparity between the objects of the combined images generally results and the objects appear "ghosted" or doubled in the composite image. The term "common field of view" is generally used herein to describe an image or a portion of an image of a scene that is viewed (or captured) by more than one camera.

In various embodiments, multiple video cameras may be mounted on a rigid substrate such that the respective field of view of each camera overlaps the respective field of view of each neighboring (adjacent) camera. The multiple video cameras may be calibrated using a fixed pattern calibration technique in accordance with an example embodiment of the invention. The resulting images may be aligned using digital warping, objects may be matched using disparity reduction techniques, and the images may be stitched together to form a large composite image. The result is a seamless high-resolution video image spanning the common field of view imaged by the multiple video cameras.

Figure 2:
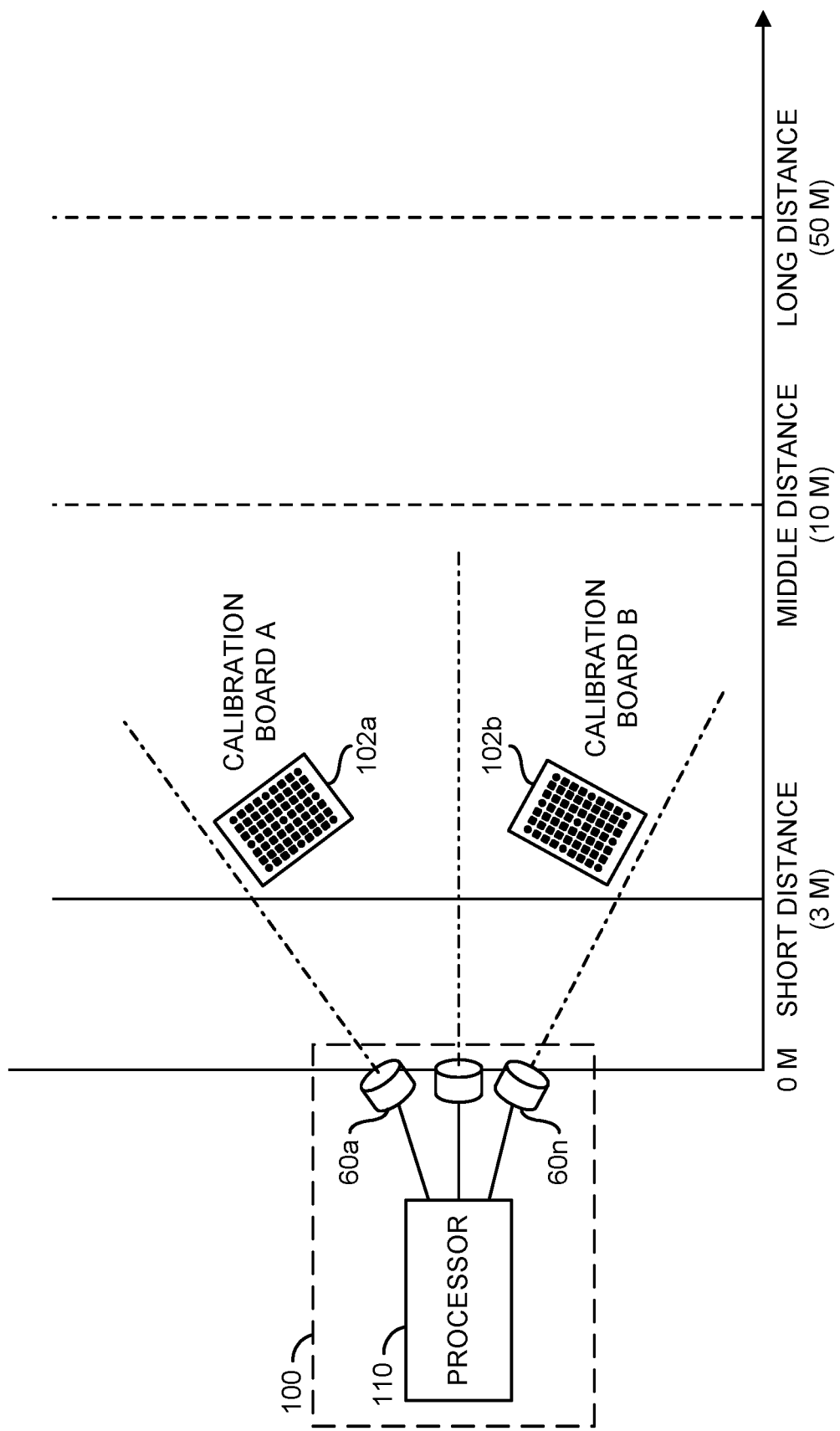
FIG. 2 is a diagram illustrating a calibration layout in accordance with an example embodiment of the present invention.

Referring to FIG. 2, a diagram is shown illustrating a calibration layout in accordance with an example embodiment of the present invention. In various embodiments, a camera (or imaging) system 100 may comprise a plurality of video cameras arranged in a spaced apart, radially directed array, so as to collectively capture a panoramic field of view. In an example, the camera system 100 may include a plurality of lenses 60a-60n. Each of the plurality of lenses 60a-60n may be associated with (attached to) a respective image capture device. Each of the plurality of lenses 60a-60n may have a respective field of view that is centered around an optical axis (e.g., illustrated by dashed center lines) of each lens. The lenses 60a-60n are generally arranged such that the respective fields of view of each adjacent pair of the lenses 60a-60n overlap.

Each of the plurality of lenses 60a-60n is associated with a respective image sensor configured to capture images of the respective fields of view through the lenses 60a-60n. Each image sensor associated with the plurality of lenses 60a-60n is generally configured to communicate a stream of digital or analog output simultaneously, to a processor 110. The processor 110 processes the plurality of signals to seamlessly stitch the multiple images of adjacent cameras into a single stream of digital or analog video output of a wide angle scene. In generating the single stream of digital or analog video output of the wide angle scene, the processor 110 generally removes any distortion created by the image capture process and removes redundant pixels recorded in the overlapping fields of view.

Because it is impractical to make a camera array with each camera having a common center of projection, camera arrays may have a small but significant baseline separation. The base separation is a problem when combining images of objects at different distances from the baseline, as a single warping function will only work perfectly for one particular distance. Images of objects not at that distance may be warped into different places, and may appear doubled ("ghosted") or truncated when the images are merged.

In various embodiments, the camera system 100 may be calibrated using a fixed pattern calibration scheme in accordance with an embodiment of the invention such that objects at any distance may be combined with no visible disparity. The camera calibration scheme in accordance with embodiments of the invention may greatly simplify the stereo matching problem. In an example, a calibration board 102a may be placed at a position to appear in the captured images of left and center cameras. Similarly, a calibration board 102b may be placed in a position to appear in the captured images of the center and right cameras. In various embodiments, the calibration boards 102a and 102b only need to be placed at positions a short distance (e.g., 3 meters(m)) from the lenses 60a-60n. Calibration parameters for more distant positions (e.g., 10 m, 50 m, etc.) may be computed using the multi-view stitching calibration technique in accordance with embodiments of the invention.

In general, the calibration of all of the camera views may be based on a center view (or baseline). In various embodiments, the minimum number of cameras for multi-view stitching is two. In an example where the total number of cameras is two, either camera may be selected as the center view (or baseline). In an example where the total number of cameras is even and greater than two, the most centered camera may be selected as the baseline. In an example where the total number of cameras is odd, the center camera is generally selected as the baseline. In general, the calibration technique in accordance with embodiments of the present invention may also be applied to two-dimensional (2D) camera arrays.

Figure 3:
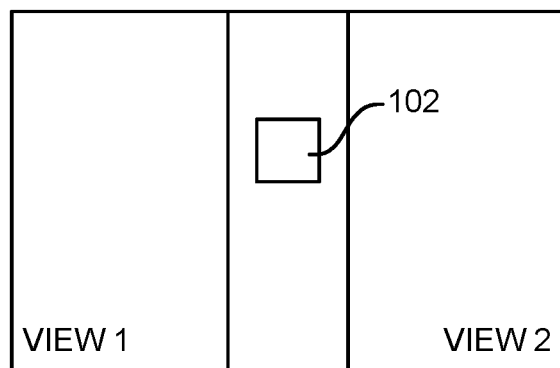
FIG. 3 is a diagram illustrating an object being imaged by two adjacent cameras in accordance with embodiments of the invention.

Referring to FIG. 3, a diagram is shown illustrating an object being imaged by two adjacent cameras in accordance with embodiments of the invention. In various embodiments, stitching adjacent frames together may be accomplished using a method or combination of methods that combine separate images into a panoramic, or combined image. In an example, a spatial transformation (warping) of quadrilateral regions may be used, which merges at least two images into one larger image, without loss of generality to multiple images. First, a number of image registration points may be determined. For example, fixed points may be imaged at known locations in each sub-image, either manually or automatically. In either case a calibration process involves pointing an array of cameras at a known, structured scene and finding corresponding points. For example, FIG. 3 illustrates views of two cameras trained on a scene that includes a rectangular target 102. In an example, the rectangular target 102 may be implemented as a chessboard or circle calibration board. The rectangular target 102 is generally placed in an area of overlap between a VIEW 1 and VIEW 2 (VIEW 1 and VIEW 2 each corresponding to an approximate respective field of view captured from one of the two cameras). The corners of the rectangular target 102 may constitute image registration points (e.g., points in common to views of each of two or more cameras of the camera array). In an embodiment where the rectangular target 102 comprises a chessboard or circle calibration board, chessboard or circle detectors may be used to obtain the image registration points.

Figure 4:
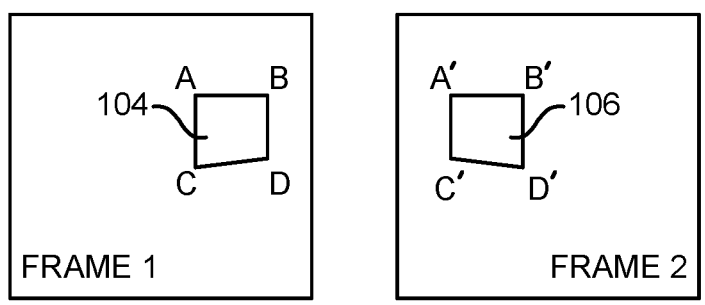
FIG. 4 is a diagram illustrating frames from the two adjacent cameras imaging a common object in accordance with embodiments of the invention.

Referring to FIG. 4, a diagram is shown illustrating the rectangular target 102 as captured in actual frames of the two cameras corresponding to VIEW 1 and VIEW 2 of FIG. 3. The frames of the two cameras are shown as abutting frames, FRAME 1 and FRAME 2. The target may be captured as a quadrilateral area 104 having corners A, B, C, and D in FRAME 1, and as a quadrilateral area 106 having corners A', B', C', and D' in FRAME 2. Because of the slightly different camera angles, the quadrilateral areas 104 and 106 are not consistent in angular construction and are generally captured in different locations with respect to other objects in the image. In an example, the abutting frames may be matched by warping each of the quadrilateral regions 104 and 106 into a common coordinate system. Note that the sides of quadrilateral area 104 are shown as straight, but may actually be subject to some barrel or pincushion distortion, which may also be approximately corrected via warping operations. In an example, barrel/pincushion distortion may be corrected using radial (rather than piecewise linear) transforms. Piecewise linear transforms may fix an approximation of the curve.

In another example, only one of the images may be warped to match a coordinate system of the other image. For example, warping of quadrilateral area 104 may be performed via a perspective transformation. Thus quadrilateral 104 in FRAME 1 may be transformed to quadrilateral 106 in the coordinate system of FRAME 2.

Because it is generally impractical to make a camera array with each camera having a common COP, camera arrays generally have a small but significant baseline separation. This is a problem when combining images of objects at different distances from the baseline, as a single warping function will only work perfectly for one particular distance. Images of objects not at that distance may be warped into different places and may appear doubled ("ghosted") or truncated when the images are merged.

In various embodiments, a camera array may be calibrated such that objects at a particular distance, or images of smooth backgrounds, may be combined with no visible disparity. A minimum disparity may be found by determining how much to shift one image to match the other. Because images are warped into corresponding squares, all that is necessary is to find a particular shift that matches the corresponding squares.

An imaging system in accordance with embodiments of the invention generally comprises a plurality of video cameras arranged in a spaced apart, radially directed array, so as to collectively capture a panoramic or panospheric field of view. The imaging system may also include a processor circuit configured to receive each stream of digital or analog output from the plurality of cameras simultaneously. The processor circuit may be configured to process the collection of signals, so as to remove any distortion created by the image capture process, to seamlessly merge the multiple images of adjacent cameras, by removing redundant pixels recorded in overlapping fields of view, so as to generate a single stream of digital or analog video output of a wide angle scene. The processor may present the wide angle scene for display onto a display device such as a monitor, a virtual reality helmet, or a projective display for viewing the image.

Figure 5:
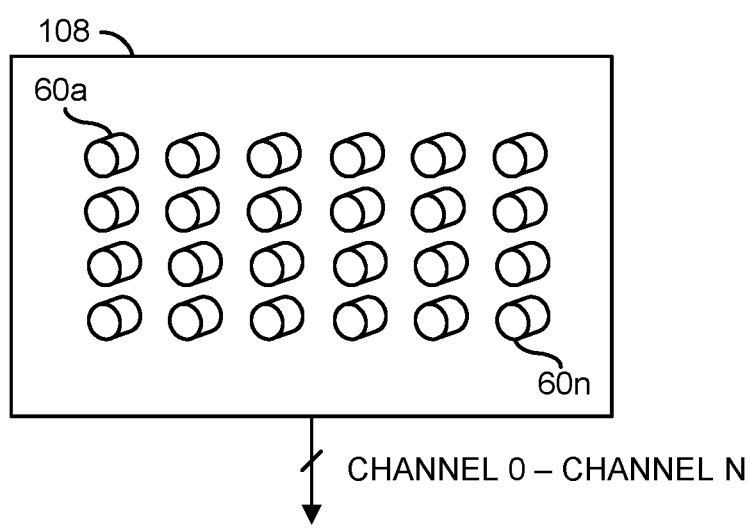
FIG. 5 is a diagram illustrating a two-dimensional (2D) array of cameras in accordance with embodiments of the invention.

Referring to FIG. 5, other configurations of the camera lenses 60a-60n are also possible. In an example, the camera lenses 60a-60n may be mounted in a planar array 108 in accordance with another example embodiment of the invention. In an example, the camera lenses 60a-60n may be aligned in various directions. In an example, the camera lenses 60a-60n may be aligned in a same direction (with overlapping views as described above). However, other, more diverse alignment may be implemented (e.g., still generally having overlapping and abutting areas) to meet design criteria of a particular implementation. For example, camera arrays may be implemented having an arrangement including, but not limited to, radial, linear, and/or planar. In some embodiments, a location and angle of each of the cameras in the camera array may be fixed with respect to each other camera. Therefore, the entire camera array may be moved without any re-calibration (re-registration) or recalculation of the matrix equations for transforming the individual images into a single panoramic scene.

Figure 6:
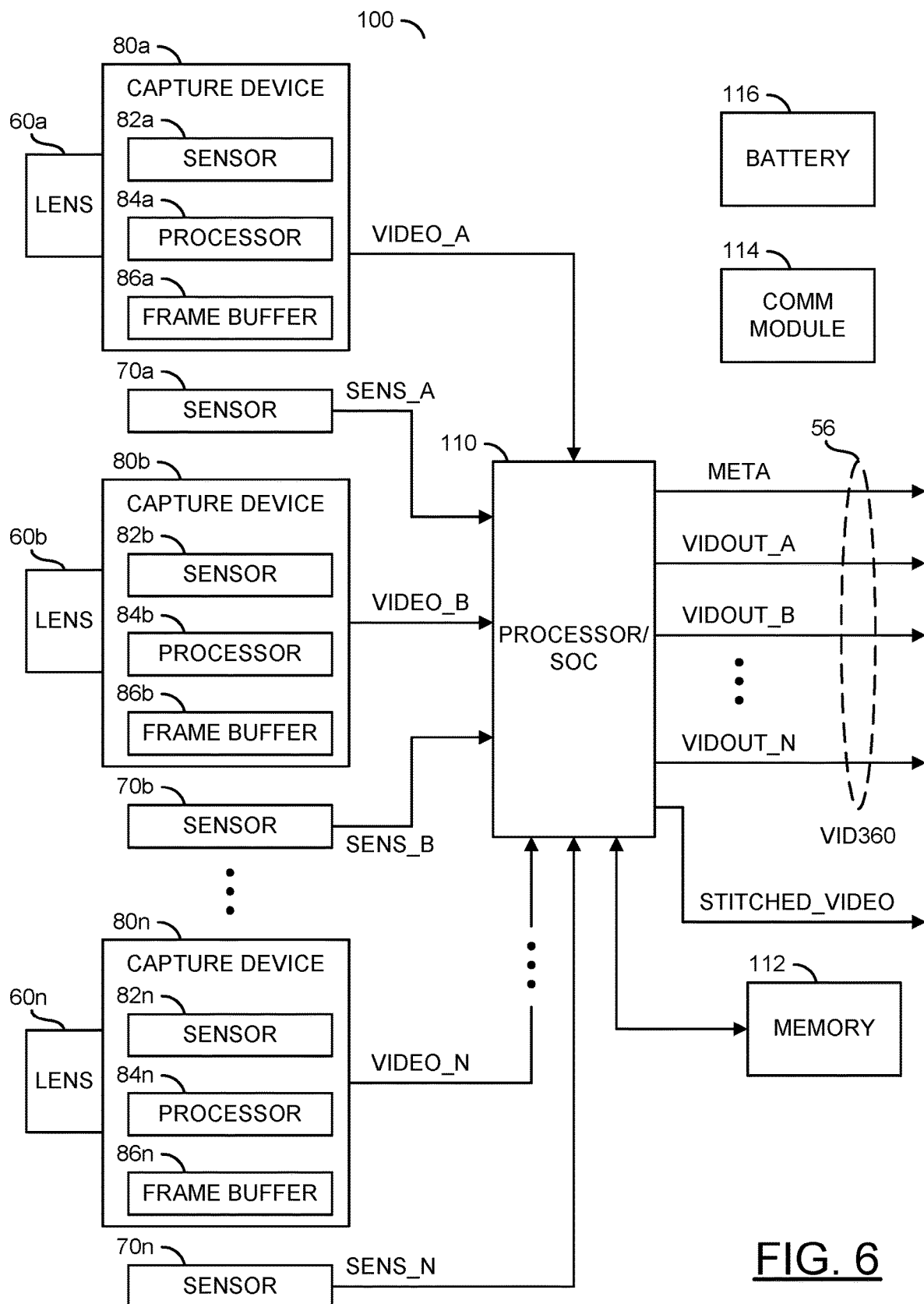
FIG. 6 is a diagram illustrating a camera system in which an example embodiment of the present invention may be implemented.

Referring to FIG. 6, a diagram is shown illustrating a camera system 100 in which an example embodiment of the present invention may be implemented. In an example, the camera system 100 may be implement as a camera system-on-a-chip connected to multiple lens and sensor assemblies. In an example embodiment, the camera system 100 may comprise lenses 60a-60n, motion sensors 70a-70n, capture devices 80a-80n, the processor/SoC 110, a block (or circuit) 112, a block (or circuit) 114, and/or a block (or circuit) 116. The circuit 112 may be implemented as a memory. The block 114 may be a communication module. The block 116 may be implemented as a battery. In some embodiments, the camera system 100 may comprise the lenses 60a-60n, the motion sensors 70a-70n, the capture devices 80a-80n, the processor/SoC 110, the memory 112, the communication module 114, and the battery 116. In another example, the camera system 100 may comprise the lenses 60a-60n, the motion sensors 70a-70n, and the capture devices 80a-80n, and the processor/SoC 110, the memory 112, the communication module 114, and the battery 116 may be components of a separate device. The implementation of the camera system 100 may be varied according to the design criteria of a particular implementation.

The lenses 60a-60n are shown attached to respective capture devices 80a-80n. In an example, the capture devices 80a-80n are shown respectively comprising blocks (or circuits) 82a-82n, blocks (or circuits) 84a-84n and blocks (or circuits) 86a-86n. The circuits 82a-82n may be sensors (e.g., image sensors). The circuits 84a-84n may be processors and/or logic. The circuits 86a-86n may be memory circuits (e.g., frame buffers).

The capture devices 80a-80n may be configured to capture video image data (e.g., light collected and focused by the lenses 60a-60n). The capture devices 80a-80n may capture data received through the lenses 60a-60n to generate a video bitstream (e.g., a sequence of video frames). The lenses 60a-60n may be directed, tilted, panned, zoomed and/or rotated to capture the environment surrounding the camera system 100 (e.g., capture data from the respective fields of view).

The capture devices 80a-80n may transform the received light into a digital data stream. In some embodiments, the capture devices 80a-80n may perform an analog to digital conversion. For example, the capture devices 80a-80n may perform a photoelectric conversion of the light received by the lenses 60a-60n. The image sensors 80-80n may transform the digital data stream into a video data stream (or bitstream), a video file, and/or a number of video frames. In an example, each of the capture devices 80a-80n may present the video data as a digital video signal (e.g., the signals VIDEO_A-VIDEO_N). The digital video signals may comprise the video frames (e.g., sequential digital images and/or audio).

The video data captured by the capture devices 80a-80n may be represented as signals/bitstreams/data VIDEO_A-VIDEO_N (e.g., a digital video signal). The capture devices 80a-80n may present the signals VIDEO_A-VIDEO_N to the processor/SoC 110. The signals VIDEO_A-VIDEO_N may represent the video frames/video data. The signals VIDEO_A-VIDEO_N may be video streams captured by the capture devices 80a-80n.

The image sensors 82a-82n may receive light from the respective lenses 60a-60n and transform the light into digital data (e.g., the bitstream). For example, the image sensors 82a-82n may perform a photoelectric conversion of the light from the lenses 60a-60n. In some embodiments, the image sensors 82a-82n may have extra margins that are not used as part of the image output. In some embodiments, the image sensors 82a-82n may not have extra margins. In some embodiments, some of the image sensors 82a-82n may have the extra margins and some of the image sensors 82a-82n may not have the extra margins. In some embodiments, the image sensors 82a-82n may be configured to generate monochrome (B/W) video signals. In some embodiments, the image sensors 82a-82n may be configured to generate color (e.g., RGB, YUV, RGB-IR, YCbCr, etc.) video signals. In some embodiments, the image sensors 82a-82n may be configured to generate video signals in response to visible and/or infrared (IR) light.

The processor/logic 84a-84n may transform the bitstream into a human viewable content (e.g., video data that may be understandable to an average person regardless of image quality, such as the video frames). For example, the processors 84a-84n may receive pure (e.g., raw) data from the camera sensors 82a-82n and generate (e.g., encode) video data (e.g., the bitstream) based on the raw data. The capture devices 80a-80n may have the memory 86a-86n to store the raw data and/or the processed bitstream. For example, the capture devices 80a-80n may implement the frame memory and/or buffers 86a-86n to store (e.g., provide temporary storage and/or cache) one or more of the video frames (e.g., the digital video signal). In some embodiments, the processors/logic 84a-84n may perform analysis and/or correction on the video frames stored in the memory/buffers 86a-86n of the capture devices 80a-80n.

The motion sensors 70a-70n may be configured to detect motion (e.g., in the respective fields of view corresponding to the viewing angles of the lenses 60a-60n). The detection of motion may be used as one threshold for activating the capture devices 80a-80n. The motion sensors 70a-70n may be implemented as internal components of the camera system 100 and/or as components external to the camera system 100. In an example, the sensors 70a-70n may be implemented as passive infrared (PIR) sensors. In another example, the sensors 70a-70n may be implemented as smart motion sensors. In an example, the smart motion sensors may comprise low resolution image sensors configured to detect motion and/or persons. The motion sensors 70a-70n may each generate a respective signal (e.g., SENS_A-SENS_N) in response to motion being detected in one of the respective zones (e.g., FOVs). The signals SENS_A-SENS_N may be presented to the processor/SoC 110. In an example, the motion sensor 70a may generate (assert) the signal SENS_A when motion is detected in the respective FOV of the lens 60a and the motion sensor 70n may generate (assert) the signal SENS_N when motion is detected in the respective FOV of the lens 60n.

The processor/SoC 110 may be configured to execute computer readable code and/or process information. The processor/SoC 110 may be configured to receive input and/or present output to the memory 112. The processor/SoC 110 may be configured to present and/or receive other signals (not shown). The number and/or types of inputs and/or outputs of the processor/SoC 110 may be varied according to the design criteria of a particular implementation. The processor/SoC 110 may be configured for low power (e.g., battery) operation.

The processor/SoC 110 may receive the signals VIDEO_A-VIDEO_N and the signals SENS_A-SENS_N. The processor/SoC 110 may generate a signal META based on the signals VIDEO_A-VIDEO_N, the signals SENS_A-SENS_N, and/or other input. In some embodiments, the signal META may be generated based on analysis of the signals VIDEO_A-VIDEO_N and/or objects detected in the signals VIDEO_A-VIDEO_N. In various embodiments, the processor/SoC 110 may be configured to perform one or more of feature extraction, object detection, object tracking, and object identification. For example, the processor/SoC 110 may determine motion information by analyzing a frame from the signals VIDEO_A-VIDEO_N and comparing the frame to a previous frame. The comparison may be used to perform digital motion estimation.

In various embodiments, the processor/SoC 110 may perform video stitching operations. The video stitching operations may be configured to facilitate seamless tracking as objects move through the respective fields of view associated with the capture devices 80a-80n. The processor/SoC 110 may generate a number of signals VIDOUT_A-VIDOUT_N and STITCHED_VIDEO. The signals VIDOUT_A-VIDOUT_N may be portions (components) of a multi-sensor video signal. In some embodiments, the processor/SoC 110 may be configured to generate a single video output signal (e.g., STITCHED_VIDEO). The video output signal(s) (e.g., STITCHED_VIDEO or VIDOUT_A-VIDOUT_N) may be generated comprising video data from one or more of the signals VIDEO_A-VIDEO_N. The video output signal(s) (e.g., STITCHED_VIDEO or VIDOUT_A-VIDOUT_N) may be presented to the memory 112 and/or the communications module 114.

The memory 112 may store data. The memory 112 may be implemented as a cache, flash memory, memory card, DRAM memory, etc. The type and/or size of the memory 112 may be varied according to the design criteria of a particular implementation. The data stored in the memory 112 may correspond to a video file, motion information (e.g., readings from the sensors 70a-70n, video stitching parameters, image stabilization parameters, user inputs, etc.) and/or metadata information.

The lenses 60a-60n (e.g., camera lenses) may be directed to provide a view of an environment surrounding the camera 100. The lenses 60a-60n may be aimed to capture environmental data (e.g., light). The lenses 60a-60n may be wide-angle lenses and/or fish-eye lenses (e.g., lenses capable of capturing a wide field of view). The lenses 60a-60n may be configured to capture and/or focus the light for the capture devices 80a-80n. Generally, the image sensors 82a-82n are located behind the lenses 60a-60n. Based on the captured light from the lenses 60a-60n, the capture devices 80a-80n may generate bitstreams and/or video data.

The communications module 114 may be configured to implement one or more communications protocols. For example, the communications module 114 may be configured to implement Wi-Fi, Bluetooth, Ethernet, etc. In embodiments where the camera 100 is implemented as a wireless camera, the protocol implemented by the communications module 114 may be a wireless communications protocol. The type of communications protocols implemented by the communications module 114 may be varied according to the design criteria of a particular implementation.

The communications module 114 may be configured to generate a broadcast signal as an output from the camera 100. The broadcast signal may send the video data VIDOUT to external devices. For example, the broadcast signal may be sent to a cloud storage service (e.g., a storage service capable of scaling on demand). In some embodiments, the communications module 114 may not transmit data until the processor/SoC 110 has performed video analytics to determine that an object is in the field of view of the camera 100.

In some embodiments, the communications module 114 may be configured to generate the manual control signal. The manual control signal may be generated in response to a signal from a user received by the communications module 114. The manual control signal may be configured to activate the processor/SoC 110. The processor/SoC 110 may be activated in response to the manual control signal regardless of the power state of the camera 100.

The camera system 100 may include a battery 116 configured to provide power for the various components of the camera 100. A multi-step approach to activating and/or disabling the capture devices 80a-80n based on the outputs of the motion sensors 70a-70n and/or any other power consuming features of the camera system 100 may be implemented to reduce a power consumption of the camera 100 and extend an operational lifetime of the battery 116. The motion sensors 70a-70n may have a very low drain on the battery 116 (e.g., less than 10 W). In an example, the motion sensors 70a-70n may be configured to remain on (e.g., always active) unless disabled in response to feedback from the processor/SoC 110. Video analytics performed by the processor/SoC 110 may have a large drain on the battery 116 (e.g., greater than the motion sensors 70a-70n). In an example, the processor/SoC 110 may be in a low-power state (or power-down) until some motion is detected by the motion sensors 70a-70b.

The camera system 100 may be configured to operate using various power states. For example, in the power-down state (e.g., a sleep state, a low-power state) the motion sensors 70a-70n and the processor/SoC 110 may be on and other components of the camera 100 (e.g., the image capture devices 80a-80n, the memory 112, the communications module 114, etc.) may be off. In another example, the camera 100 may operate in an intermediate state. In the intermediate state, one of the image capture devices 80a-80n may be on and the memory 112 and/or the communications module 114 may be off. In yet another example, the camera system 100 may operate in a power-on (or high power) state. In the power-on state, the motion sensors 70a-70n, the processor/SoC 110, the capture devices 80a-80n, the memory 112 and/or the communications module 114 may be on. The camera system 100 may consume some power from the battery 116 in the power-down state (e.g., a relatively small and/or minimal amount of power). The camera system 100 may consume more power from the battery 116 in the power-on state. The number of power states and/or the components of the camera system 100 that are on while the camera system 100 operates in each of the power states may be varied according to the design criteria of a particular implementation.

Figure 7:
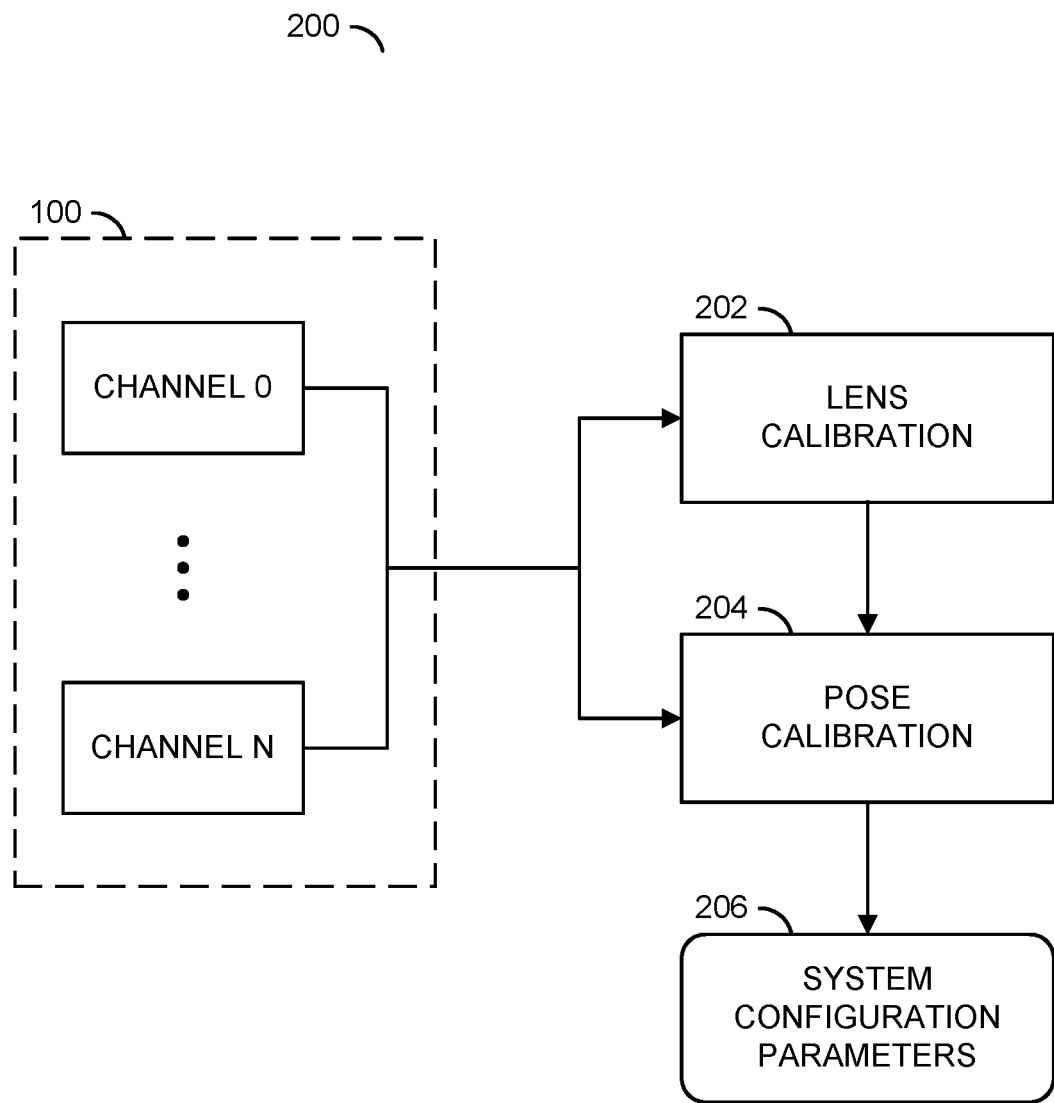
FIG. 7 is a diagram illustrating a calibration process in accordance with an example embodiment of the present invention.

Referring to FIG. 7, a diagram is shown illustrating a calibration process 200 in accordance with an example embodiment of the present invention. In various embodiments, the process 200 generally implements the new calibration technique. The new calibration technique may generate stitching calibration distance parameters automatically and the calibration flow may be much more efficient. With the advances in technology, stitching calibration may be built to leverage lens intrinsic and distortion information, together with the extrinsic calibration information for a number of targets to get good stitching calibration information in any position.

In an example embodiment, the process (or method) 200 may comprise a step (or state) 202, a step (or state) 204, and a step (or state) 206. The step 202 generally implements a first stage of a multi-view stitching process pipeline. The step 204 generally implements a second stage of the multi-view stitching process pipeline. The step 206 generally presents the system configuration parameters for multi-view stitching that were calculated in the multi-view stitching process pipeline.

The step 202 generally performs a lens calibration process. In an example, the lens calibration process may comprise geometry calibration. Geometry calibration should be done for each lens in the camera system 100. The geometry calibration is generally performed on each channel (e.g., Channel 0 through Channel N) to obtain intrinsic parameters and distortion parameters for each of the lenses in the system 100. The lens calibration step is very important for distance measuring accuracy in the step 204 of the multi-view stitching process pipeline. In general, it is better to cover the full field of view (FOV) with multiple images from the calibration target pattern.

In an example, the lens calibration may be done using a techniques found in "A Flexible New Technique for Camera Calibration," Zhengyou Zhang, IEEE Trans. Pattern Analysis and Machine Intelligence, December 2000, Vol. 22: pp. 1330-1334, and "Flexible Camera Calibration By Viewing a Plane From Unknown Orientations," Zhengyou Zhang, Computer Vision, 1999, The Proceedings of the Seventh IEEE International Conference on, September 1999, Published by IEEE, which are hereby incorporated by reference. In general, because there may be distortion for each lens, distortion parameters (e.g., k1, k2, k3, p1, p2, etc.) may be defined for each lens. Intrinsic parameters (e.g., fx, fy, cx, cy, etc.) may be defined as well. In a example, the distortion and intrinsic parameters may be fit by taking many snapshots of a calibration pattern (e.g., chessboard, circle board, etc.). Examples of calibration patterns may be found in "A Flexible New Technique for Camera Calibration," Zhengyou Zhang, IEEE Trans. Pattern Analysis and Machine Intelligence, December 2000, Vol. 22: pp. 1330-1334, and "Flexible Camera Calibration By Viewing a Plane From Unknown Orientations," Zhengyou Zhang, Computer Vision, 1999, The Proceedings of the Seventh IEEE International Conference on, September 1999, Published by IEEE, which are hereby incorporated by reference.

In the step 204, the process 200 generally performs pose calibration using input from the channels Channel 0 through Channel N and the intrinsic parameters and distortion parameters obtained in the step 202 for each of the lenses. In the step 204, the process 200 generally uses calibration boards (or targets) at a short distance (e.g., 3 meters) for performing stitching calibration, and then calculates system configuration parameters for multi-view stitching for medium and long distance stitching. In the step 206, the process 200 generally presents the system configuration parameters for multi-view stitching that were calculated in the multi-view stitching process pipeline. The system configuration parameters generally facilitate multi-view stitching at any position from the lenses in the respective FOVs.

Figure 8:
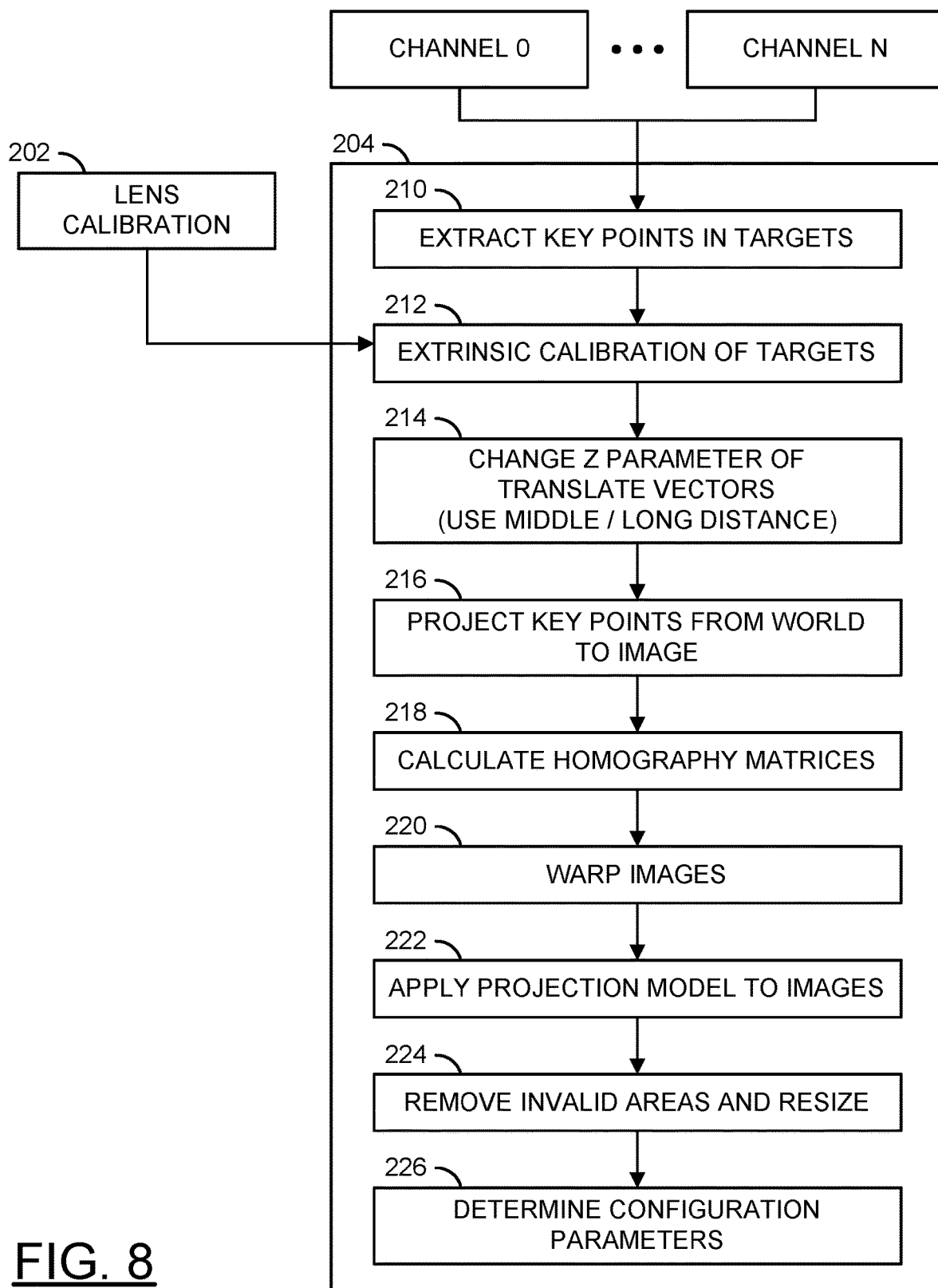
FIG. 8 is a diagram illustrating a pose calibration process in accordance with an example embodiment of the present invention.

Referring to FIG. 8, a diagram is shown illustrating an example implementation of the pose calibration process 204 in accordance with an example embodiment of the present invention. In various embodiments, the pose calibration process 204 receives input from the channels Channel 0 through Channel N and the intrinsic parameters and distortion parameters for each of the lenses obtained in the lens calibration step 202. In an example embodiment, the pose calibration process (or method) 204 comprises a step (or state) 210, a step (or state) 212, a step (or state) 214, a step (or state) 216, a step (or state) 218, a step (or state) 220, a step (or state) 222, a step (or state) 224, a step (or state) 226. The pose calibration process 204 generally begins in the step 210.

In the step 210, a circle or chessboard detector may be used to detect a circle center or corner on a calibration board. A flat and rigid calibration board is generally placed between two views at a short distance (e.g., 3 meters) from the lenses. In an example where three cameras are used, a calibration board A may be placed in a position to show in the respective FOVs of a left camera and a center camera, and a calibration board B may be placed in a position to show in the respective FOVs of a right camera and the center camera. A detected point in one view should be matched in the other view. In the step 212, an extrinsic calibration for each lens is performed using the intrinsic parameters (e.g., fx, fy, cx, cy, etc.) and the distortion parameters (e.g., k1, k2, k3, p1, p2, etc.) from the lens calibration step 202. In an example, the extrinsic parameters generally contain a rotation matrix (e.g., $R_{3\times3}$) and a translation vector (e.g., $T_{3\times1}$). In the step 214, a z value of the translation vector is generally changed to the specific middle or long distance desired, and the rotation matrix is kept the same.

In the step 216, key points are generally projected from world coordinates to image coordinates. In an example, the following Equation 2 may be used:

$$Z_c \begin{bmatrix} u \\ v \\ 1 \end{bmatrix} = \begin{bmatrix} f_x & s & x_0 \\ 0 & f_y & y_0 \\ 0 & 0 & 1 \end{bmatrix} \begin{bmatrix} R_{3\times3} & T_{3\times1} \\ 0^T & 1 \end{bmatrix} \begin{bmatrix} X_w \\ Y_w \\ Z_w \\ 1 \end{bmatrix}$$

where fx represents focal length in the horizontal axis, fy represents focal length in the vertical axis, $x_0$ represents center coordinate on horizontal axis, $y_0$ represents center coordinate on vertical axis, $R_{3\times3}$ represents the rotation matrix, $T_{3\times1}$ represents the translation vector, u and v represent a coordinate in the image, $X_W$, $Y_W$, $Z_W$ represent the real world coordinate, and $Z_c$ represents depth of point in camera coordinates.

In the step 218, a homography matrix between two neighboring views may be calculated. In general, the matrices of all of the views may be based on a center view (or base). In an example where the total number of cameras is two, either camera may be selected as the base. In an example where the total number of cameras is even and greater than two, the most centered camera may be selected as the base. In an example where the total number of cameras is odd, the center camera is generally selected as the base.

In the step 220, intrinsic parameters and distortion parameters may be applied to a corresponding image. The corresponding image may be warped with the homography matrix. In the step 222, a cylindrical projection model may be applied for all views. However, other projection models may be applied to meet design criteria of a particular implementation. In an example for horizontal direction stitching, models like perspective, cylindrical, equi-rectangular, etc. may be applied. In another example for vertical direction stitching, models like transverse, cylindrical, mercator, etc. may be applied.

In the step 224, invalid area(s) brought by distortion or projection may be removed, each view may be cropped to an inscribed quadrilateral, while maintaining an aspect ratio of the quadrilateral, and zoomed to be close to original size. In the step 226, the overlap area of the neighboring two views may be calculated for middle and/or long distance. Configuration parameters are generally obtained for offset/width/height of each view.

Figure 9:
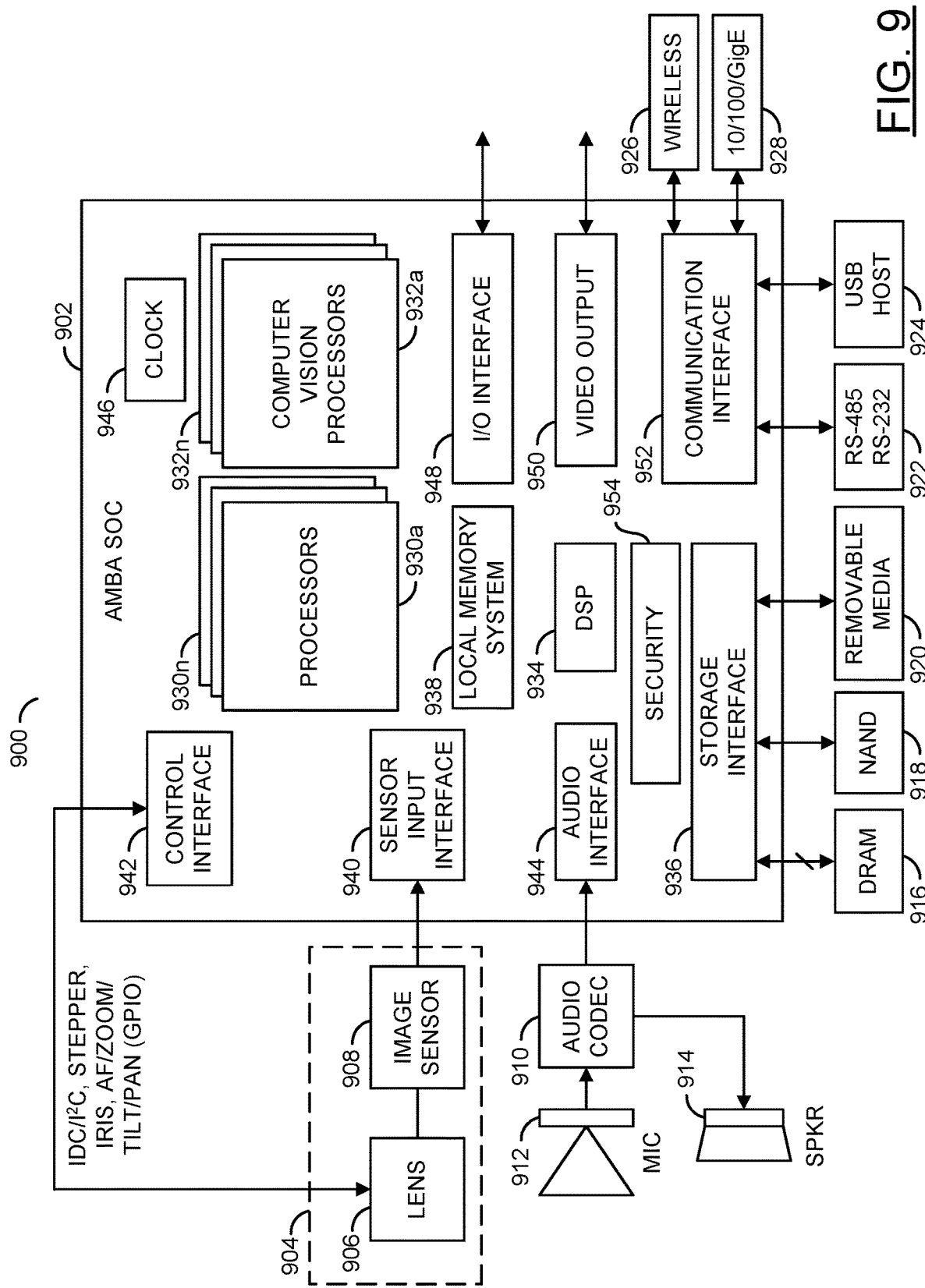
FIG. 9 is a diagram of a camera system illustrating an example implementation of a computer vision system in which a calibration technique in accordance with example embodiments of the invention may be implemented.

Referring to FIG. 9, a diagram of a camera system 900 is shown illustrating an example implementation of a computer vision system in which a fixed pattern calibration scheme for multi-view stitching in accordance with example embodiments of the invention may be implemented. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 8.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as a single sensor. In another example, the circuit 908 may be implemented as a stereo pair of sensors. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor(s) 908 may receive light from the lens assembly 906. The image sensor(s) 908 may be configured to transform the received focused light into digital data (e.g., bitstreams). In some embodiments, the image sensor(s) 908 may perform an analog to digital conversion. For example, the image sensor(s) 908 may perform a photoelectric conversion of the focused light received from the lens assembly 906. The image sensor(s) 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 168 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, Zig-Bee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. The processor/camera circuit 902 may also include support for communication using one or more of the universal serial bus protocols (e.g., USB 1.0, 2.0, 3.0, etc.).

Figure 10:
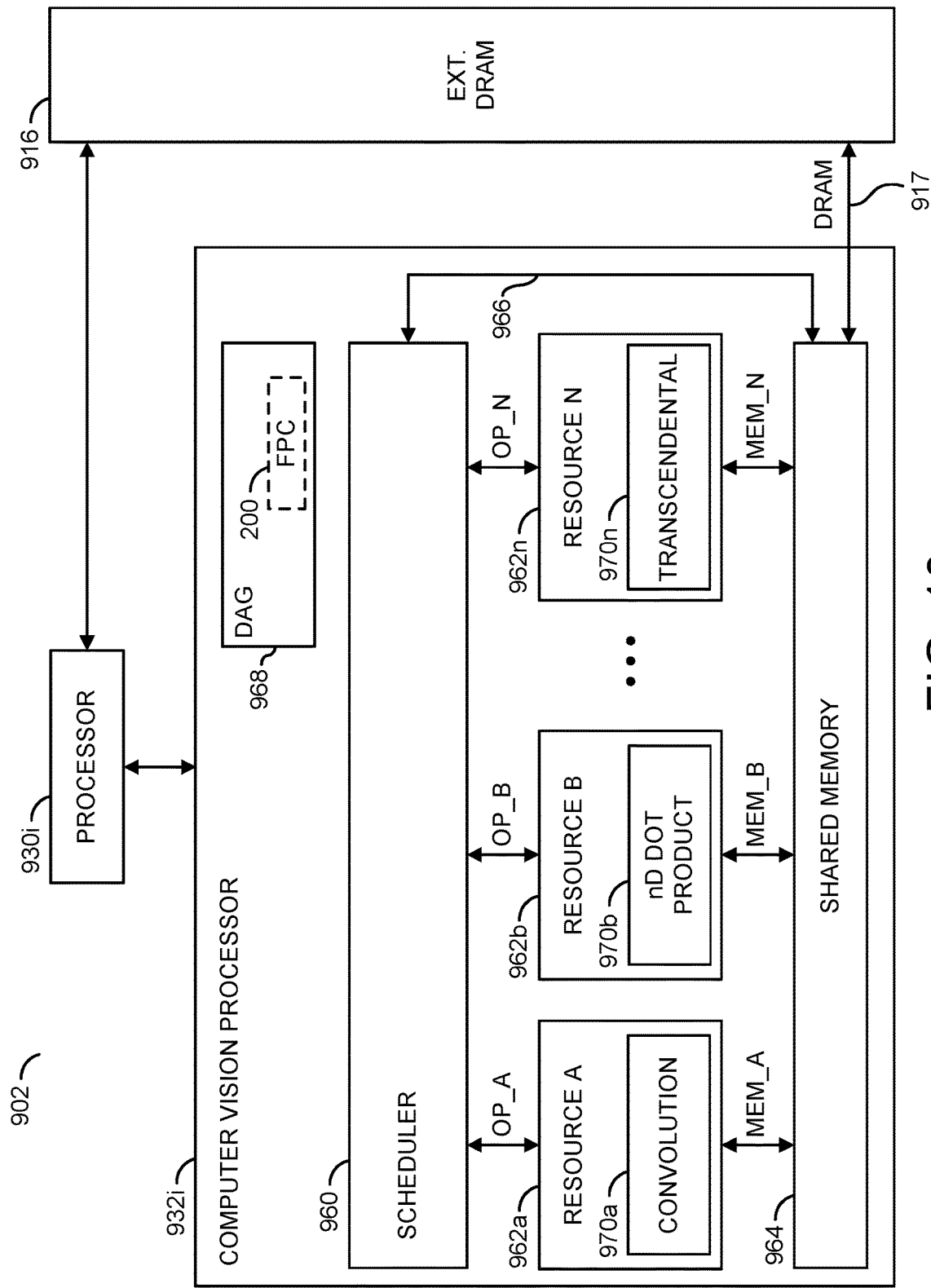
FIG. 10 is a diagram illustrating a context in which a calibration technique in accordance with an example embodiment of the invention may be implemented.

Referring to FIG. 10, a diagram of a processing circuit 902 is shown illustrating a context in which a fixed pattern calibration scheme for multi-view stitching in accordance with an example embodiment of the invention may be implemented. In various embodiments, the processing circuit 902 may be implemented as part of a computer vision system. In various embodiments, the processing circuit 902 may be implemented as part of a camera, a computer, a server (e.g., a cloud server), a smart phone (e.g., a cellular telephone), a personal digital assistant, or the like. In an example, the processing circuit 902 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuit 902 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processing circuit 902 may comprise a block (or circuit) 930i, a block (or circuit) 932i, a block (or circuit) 916, and/or a memory bus 917. The circuit 930i may implement a first processor. The circuit 932i may implement a second processor. In an example, the circuit 932i may implement a computer vision processor. In an example, the processor 932i may be an intelligent vision processor. The circuit 916 may implement an external memory (e.g., a memory external to the circuits 930i and 932i). In an example, the circuit 916 may be implemented as a dynamic random access memory (DRAM) circuit. The processing circuit 902 may comprise other components (not shown). The number, type and/or arrangement of the components of the processing circuit 902 may be varied according to the design criteria of a particular implementation.

The circuit 930i may implement a processor circuit. In some embodiments, the processor circuit 930i may be implemented using a general purpose processor circuit. The processor 930i may be operational to interact with the circuit 932i and the circuit 916 to perform various processing tasks. In an example, the processor 930i may be configured as a controller for the circuit 932i. The processor 930i may be configured to execute computer readable instructions. In one example, the computer readable instructions may be stored by the circuit 916. In some embodiments, the computer readable instructions may comprise controller operations. The processor 930i may be configured to communicate with the circuit 932i and/or access results generated by components of the circuit 932i. In an example, the processor 930i may be configured to utilize the circuit 932i to perform operations associated with one or more neural network models.

In an example, the processor 930i may be configured to program the circuit 932i with the fixed pattern calibration (FPC) for multi-view stitching scheme 200. In various embodiments, the FPC technique 200 may be configured for operation in an edge device. In an example, the processing circuit 902 may be coupled to a sensor (e.g., video camera, etc.) configured to generate a data input. The processing circuit 902 may be configured to generate one or more outputs in response to the data input from the sensor. The data input may be processed by the FPC technique 200. The operations performed by the processor 930i may be varied according to the design criteria of a particular implementation.

In various embodiments, the circuit 916 may implement a dynamic random access memory (DRAM) circuit. The circuit 916 is generally operational to store multidimensional arrays of input data elements and various forms of output data elements. The circuit 916 may exchange the input data elements and the output data elements with the processor 930i and the processor 932i.

The processor 932i may implement a computer vision processor circuit. In an example, the processor 932i may be configured to implement various functionality used for computer vision. The processor 932i is generally operational to perform specific processing tasks as arranged by the processor 930i. In various embodiments, all or portions of the processor 932i may be implemented solely in hardware. The processor 932i may directly execute a data flow directed to the fixed pattern calibration scheme for multi-view stitching, and generated by software (e.g., a directed acyclic graph, etc.) that specifies processing (e.g., computer vision) tasks. In some embodiments, the processor 932i may be a representative example of numerous computer vision processors implemented by the processing circuit 902 and configured to operate together.

In an example embodiment, the processor 932i generally comprises a block (or circuit) 960, one or more blocks (or circuits) 962a-962n, a block (or circuit) 960, a path 966, and a block (or circuit) 968. The block 960 may implement a scheduler circuit. The blocks 962a-962n may implement hardware resources (or engines). The block 964 may implement a shared memory circuit. The block 968 may implement a directed acyclic graph (DAG) memory. In an example embodiment, one or more of the circuits 962a-962n may comprise blocks (or circuits) 970a-970n. In the example shown, circuits 970a, 970b, and 970n are implemented.

In an example embodiment, the circuit 970a may implement convolution operations, the circuit 970b may be configured to provide n-dimensional (nD) dot product operations, and the circuit 970n may be configured to perform transcendental operations. The circuits 970a-970n may be utilized to provide the fixed pattern calibration scheme for multi-view stitching in accordance with an example embodiment of the invention. The convolution, nD dot product, and transcendental operations may be used to perform computer (or machine) vision tasks (e.g., as part of an object detection process, etc.). In yet another example, one or more of the circuits 962c-962n may comprise blocks (or circuits) 970c-970n (not shown) to provide convolution calculations in multiple dimensions.

In an example, the circuit 932i may be configured to receive directed acyclic graphs (DAGs) from the processor 930i. The DAGs received from the processor 930i may be stored in the DAG memory 968. The circuit 932i may be configured to execute a DAG for the fixed pattern calibration scheme for multi-view stitching using the circuits 960, 962a-962n, and 964.

Multiple signals (e.g., OP_A to OP_N) may be exchanged between the circuit 960 and the respective circuits 962a-962n. Each signal OP_A to OP_N may convey execution operation information and/or yield operation information. Multiple signals (e.g., MEM_A to MEM_N) may be exchanged between the respective circuits 962a-962n and the circuit 964. The signals MEM_A to MEM_N may carry data. A signal (e.g., DRAM) may be exchanged between the circuit 916 and the circuit 964. The signal DRAM may transfer data between the circuits 916 and 960 (e.g., on the memory bus 966).

The circuit 960 may implement a scheduler circuit. The scheduler circuit 960 is generally operational to schedule tasks among the circuits 962a-962n to perform a variety of computer vision related tasks as defined by the processor 930i. Individual tasks may be allocated by the scheduler circuit 960 to the circuits 962a-962n. The scheduler circuit 960 may allocate the individual tasks in response to parsing the directed acyclic graphs (DAGs) provided by the processor 930i. The scheduler circuit 960 may time multiplex the tasks to the circuits 962a-962n based on the availability of the circuits 962a-962n to perform the work.

Each circuit 962a-962n may implement a processing resource (or hardware engine). The hardware engines 962a-962n are generally operational to perform specific processing tasks. The hardware engines 962a-962n may be implemented to include dedicated hardware circuits that are optimized for high-performance and low power consumption while performing the specific processing tasks. In some configurations, the hardware engines 962a-962n may operate in parallel and independent of each other. In other configurations, the hardware engines 962a-962n may operate collectively among each other to perform allocated tasks.

The hardware engines 962a-962n may be homogenous processing resources (e.g., all circuits 962a-962n may have the same capabilities) or heterogeneous processing resources (e.g., two or more circuits 962a-962n may have different capabilities). The hardware engines 962a-962n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator, and a power of two downsample operator, etc.

In various embodiments, the hardware engines 962a-962n may be implemented solely as hardware circuits. In some embodiments, the hardware engines 962a-962n may be implemented as generic engines that may be configured through circuit customization and/or software/firmware to operate as special purpose machines (or engines). In some embodiments, the hardware engines 962a-962n may instead be implemented as one or more instances or threads of program code executed on the processor 930i and/or one or more processors 932i, including, but not limited to, a vector processor, a central processing unit (CPU), a digital signal processor (DSP), or a graphics processing unit (GPU). In some embodiments, one or more of the hardware engines 962a-962n may be selected for a particular process and/or thread by the scheduler 960. The scheduler 960 may be configured to assign the hardware engines 962a-962n to particular tasks in response to parsing the directed acyclic graphs stored in the DAG memory 968.

The circuit 964 may implement a shared memory circuit. The shared memory 964 may be configured to store data in response to input requests and/or present data in response to output requests (e.g., requests from the processor 930i, the DRAM 916, the scheduler circuit 960 and/or the hardware engines 962a-962n). In an example, the shared memory circuit 964 may implement an on-chip memory for the computer vision processor 932i. The shared memory 964 is generally operational to store all of or portions of the multidimensional arrays (or vectors) of input data elements and output data elements generated and/or utilized by the hardware engines 962a-962n. The input data elements may be transferred to the shared memory 964 from the DRAM circuit 916 via the memory bus 917. The output data elements may be sent from the shared memory 964 to the DRAM circuit 916 via the memory bus 917.

The path 966 may implement a transfer path internal to the processor 932i. The transfer path 966 is generally operational to move data from the scheduler circuit 960 to the shared memory 964. The transfer path 966 may also be operational to move data from the shared memory 964 to the scheduler circuit 960.

The processor 930i is shown communicating with the computer vision processor 932i. The processor 930i may be configured as a controller for the computer vision processor 932i. In some embodiments, the processor 930i may be configured to transfer instructions to the scheduler 960. For example, the processor 930i may provide one or more directed acyclic graphs to the scheduler 960 via the DAG memory 968. The scheduler 960 may initialize and/or configure the hardware engines 962a-962n in response to parsing the directed acyclic graphs. In some embodiments, the processor 930i may receive status information from the scheduler 960. For example, the scheduler 960 may provide a status information and/or readiness of outputs from the hardware engines 962a-962n to the processor 930i to enable the processor 930i to determine one or more next instructions to execute and/or decisions to make. In some embodiments, the processor 930i may be configured to communicate with the shared memory 964 (e.g., directly or through the scheduler 960, which receives data from the shared memory 964 via the path 966). The processor 930i may be configured to retrieve information from the shared memory 964 to make decisions. The instructions performed by the processor 930i in response to information from the computer vision processor 932i may be varied according to the design criteria of a particular implementation.

The circuit 970a may implement a convolution circuit. The convolution circuit 970a may be in communication with the memory 964 to receive input data and present the output data. The convolution circuit 970a is generally operational to fetch a plurality of data vectors from the shared memory circuit 964. Each data vector may comprise a plurality of the data values. The convolution circuit 970a may also be operational to fetch a kernel from the shared memory 964. The kernel generally comprises a plurality of kernel values. The convolution circuit 970a may also be operational to fetch a block from the shared memory 964 to an internal (or local) buffer. The block generally comprises a plurality of input tiles. Each input tile may comprise a plurality of input values in multiple dimensions. The convolution circuit 970a may also be operational to calculate a plurality of intermediate values in parallel by multiplying each input tile in the internal buffer with a corresponding one of the kernel values and calculate an output tile comprising a plurality of output values based on the intermediate values. In various embodiments, the convolution circuit 970a may be implemented solely in hardware. An example of a convolution calculation scheme that may be used to implement the circuit 970a may be found in U.S. Pat. No. 10,210,768, which is herein incorporated by reference in its entirety. The circuit 970b may implement an nD dot product process. The circuit 970n may implement a transcendental operation process. In various embodiments, a fixed pattern calibration scheme for multi-view stitching in accordance with embodiments of the invention may be performed according to implementation descriptions provided herein.

Figure 11:
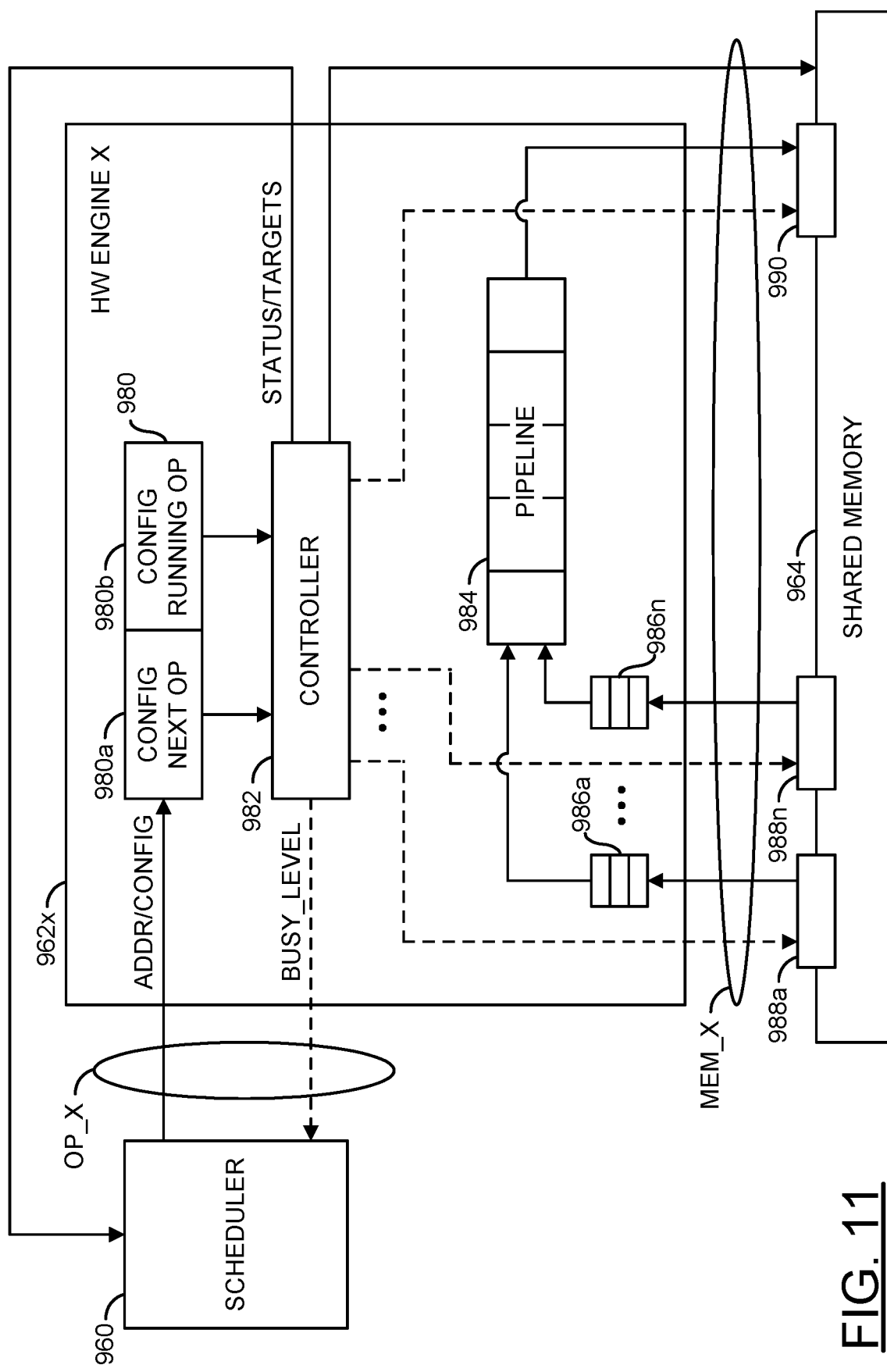
FIG. 11 is a diagram illustrating a generic implementation of a hardware engine of FIG. 10.

Referring to FIG. 11, a diagram illustrating an example implementation of a generic hardware engine 962x of FIG. 10 is shown. The hardware engine 962x may be representative of the hardware engines 962a-962n. The hardware engine 962x generally comprises a block (or circuit) 980, a block (or circuit) 982, a block (or circuit) 984, and a number of blocks (or circuits) 986a-986n. The circuit 980 may be implemented as a pair of memories (or buffers) 980a and 980b. The circuit 982 may implement a controller circuit. In an example, the circuit 982 may include one or more finite state machines (FSMs) configured to control various operators implemented by the hardware engine 962x. The circuit 984 may implement a processing pipeline of the hardware engine 962x. The circuits 986a-986n may implement first-in-first-out (FIFO) memories. The circuits 986a-986n may be configured as input buffers for the processing pipeline 984. The shared memory 964 may be configured (e.g., by signals from the circuit 982) as multiple shared input buffers 988a-988n and one or more output buffers 990.

A signal (e.g., ADDR/CONFIG) may be generated by the scheduler circuit 960 and received by the hardware engine 962x. The signal ADDR/CONFIG may carry address information and configuration data. A signal (e.g., BUSY_LEVEL) may be generated by the circuit 982 and transferred to the scheduler circuit 960. The signal BUSY_LEVEL may convey the busy level of the hardware engine 962x. A signal (e.g., STATUS/TARGETS) may be generated by the circuit 982 and transferred to the scheduler circuit 960. The signal STATUS/TARGETS may provide status information regarding the hardware engine 962x and target information for the operands.

In an example embodiment, the buffers 980a and 980b may be configured as a double-banked configuration buffer. The double-banked buffer may be operational to store configuration information for a currently running operation in one buffer (e.g., the buffer 980b) while configuration information for a next operation is being moved into the other buffer (e.g., the buffer 980a). The scheduler 960 generally loads operator configuration information, including status words in a case where the operator has been partially processed in previous operator chunks, into the double-banked buffer. Once the circuit 982 is finished with the configuration information of the running operation and the configuration information for the next operation has been received, the buffers 980a and 980b may swapped.

The circuit 982 generally implements the control circuitry of the hardware engine 962x. The circuit 982 determines when to switch from the currently running operator to the new operator. The controller 982 is generally operational to control the movement of information into, out of, and internal to the hardware engine 982x. In general, the operation of the hardware engine 962x is pipelined. During an operator switch, a front end of the pipeline 984 may already be working on data for the new operator while a tail-end of the pipeline 984 is still finishing up the processing associated with old operator.

The circuit 984 may implement a pipeline circuit. The pipeline circuit 984 is generally operational to process operands received from the shared memory 964 using functionality designed into the hardware engine 962x. The circuit 984 may communicate data resulting from the functions performed to the one or more shared buffers 990.

The buffers 986a-986n may implement FIFO buffers. The FIFO buffers 986a-986n may be operational to store operands received from the shared buffers 988a-988n for processing in the pipeline 984. In general, the number of FIFO buffers and the number of shared buffers implemented may be varied to meet the design criteria of a particular application.

The functions performed by and structures illustrated in the diagrams of FIGS. 1 to 11 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data from two or more cameras arranged to obtain a predetermined field of view, wherein respective fields of view of each pair of said two or more cameras overlap; and
a processor configured to process said pixel data arranged as video frames and perform a fixed pattern calibration for facilitating multi-view stitching, said fixed pattern calibration comprising (a) performing a geometry calibration process to obtain intrinsic parameters and distortion parameters for each lens of said two or more cameras, and (b) applying a pose calibration process to said video frames, wherein said pose calibration process uses (i) said intrinsic parameters, a respective translate vector, a respective rotation matrix, and said distortion parameters for each lens of said two or more cameras and (ii) a calibration board to obtain configuration parameters for the respective fields of view of said two or more cameras, and said pose calibration process comprises changing a z value of said respective translate vector for each lens of said two or more cameras to at least one of a middle distance value and a long distance value while maintaining said respective rotation matrix for each lens of said two or more cameras unchanged.

2. The apparatus according to claim 1, wherein said pose calibration process comprises using at least one of a circle detector and a chessboard detector to detect a circle center or a corner, respectively, on the calibration board; and
determining whether a detected point in one view is matched in another view.

3. The apparatus according to claim 1, wherein said pose calibration process further comprises performing an extrinsic calibration for each lens of said two or more cameras using said intrinsic parameters and said distortion parameters for each lens of said two or more cameras, wherein extrinsic parameters for each lens of said two or more cameras comprise said respective rotation matrix and said respective translate vector.

4. The apparatus according to claim 1, wherein said pose calibration process comprises projecting key points from world coordinates to image coordinates.

5. The apparatus according to claim 1, wherein said pose calibration process comprises calculating a respective homography matrix between each adjacent pair of said two or more cameras.

6. The apparatus according to claim 5, wherein said respective homography matrix between each adjacent pair of said two or more cameras is based on a center view.

7. The apparatus according to claim 5, wherein said pose calibration process comprises:
applying said intrinsic parameters and said distortion parameters for each lens of said two or more cameras to a corresponding image; and
warping the corresponding image with the respective homography matrix.

8. The apparatus according to claim 1, wherein said pose calibration process comprises applying a projection model to views of said two or more cameras.

9. The apparatus according to claim 8, wherein:
for horizontal direction stitching said projection model comprises at least one of a perspective model, a cylindrical model, and an equirectangular model; and
for vertical direction stitching said projection model comprises at least one of a transverse cylindrical model and a mercator model.

10. A method of fixed pattern calibration for multi-view stitching with multiple cameras comprising:
arranging two or more cameras to obtain a predetermined field of view, wherein respective fields of view of each adjacent pair of said two or more cameras overlap;
performing a geometry calibration process to obtain intrinsic parameters and distortion parameters for each lens of said two or more cameras; and
applying a pose calibration process to video frames from said two or more cameras, wherein said pose calibration process uses (i) said intrinsic parameters, a respective translate vector, a respective rotation matrix, and said distortion parameters for each lens of said two or more cameras and (ii) a calibration board to obtain configuration parameters for the respective fields of view of said two or more cameras, and said pose calibration process comprises changing a z value of said respective translate vector for each lens of said two or more cameras to at least one of a middle distance value and a long distance value while maintaining said respective rotation matrix for each lens of said two or more cameras unchanged.

11. The method according to claim 10, wherein said pose calibration process comprises using at least one of a circle detector and a chessboard detector to detect a circle center or a corner, respectively, on the calibration board; and
determining whether a detected point in one view is matched in another view.

12. The method according to claim 10, wherein said pose calibration process further comprises performing an extrinsic calibration for each lens of said two or more cameras using said intrinsic parameters and said distortion parameters for each lens of said two or more cameras, wherein extrinsic parameters for each lens of said two or more cameras comprise said respective rotation matrix and said respective translate vector.

13. The method according to claim 10, wherein said pose calibration process comprises projecting key points from world coordinates to image coordinates.

14. The method according to claim 10, wherein said pose calibration process comprises calculating a respective homography matrix between each adjacent pair of said two or more cameras.

15. The method according to claim 14, wherein said respective homography matrix between each adjacent pair of said two or more cameras is based on a center view.

16. The method according to claim 14, wherein said pose calibration process comprises:
applying said intrinsic parameters and said distortion parameters for each lens of said two or more cameras to a corresponding image; and
warping the corresponding image with the respective homography matrix.

17. The method according to claim 10, wherein said pose calibration process comprises applying a projection model to views of said two or more cameras.

18. The method according to claim 17, wherein:
for horizontal direction stitching said projection model comprises at least one of a perspective model, a cylindrical model, and an equirectangular model; and
for vertical direction stitching said projection model comprises at least one of a transverse cylindrical model and a mercator model.

19. The method according to claim 17, wherein said pose calibration process comprises cropping each view to an inscribed quadrilateral, while maintaining an aspect ratio of the quadrilateral, and zooming to an original size of each view.

20. The method according to claim 10, wherein said configuration parameters are obtained for one or more of an offset, a width, and a height of the respective fields of view of said two or more cameras.

* * * * *